United States Patent [19]

Maier et al.

[11] 4,325,647

[45] Apr. 20, 1982

[54] ELEMENT AND METHOD FOR CONNECTING CERAMIC AND METALLIC PARTS

[75] Inventors: Horst R. Maier; Axel Krauth; Hans-Juergen Pohlmann; Horst Nink, all of Selb; Helmut Brobeck, Hessheim; Ingo Cropp, Frankenthal; Dieter Bergmeier, Heidelberg, all of Fed. Rep. of Germany

[73] Assignees: Rosenthal Technik A.G., Selb; Aktiengesellschaft Kuehnle, Kopp & Kausch, Frankenthal, both of Fed. Rep. of Germany

[21] Appl. No.: 96,615

[22] Filed: Nov. 23, 1979

[30] Foreign Application Priority Data

Nov. 29, 1978 [DE] Fed. Rep. of Germany ....... 2851507

[51] Int. Cl.³ .................... F16C 9/00; F16D 1/00; F16G 11/00
[52] U.S. Cl. ..................................... 403/29; 403/179; 403/404
[58] Field of Search ............... 403/28, 29, 179, 404, 403/371; 416/241 B, 244 A

[56] References Cited

U.S. PATENT DOCUMENTS

| 1,066,290 | 7/1913 | Kraus | 403/29 |
|---|---|---|---|
| 1,558,524 | 10/1925 | Winninghoff | 403/29 |
| 2,015,484 | 9/1935 | Lilienfeld | 403/179 |
| 2,276,218 | 3/1940 | Lemmens | 403/179 |
| 3,114,612 | 12/1963 | Friedrich | |
| 3,284,176 | 11/1966 | Reed et al. | 29/195 |
| 3,664,692 | 5/1972 | Spieth | 403/371 X |
| 3,887,412 | 6/1975 | Stuhr | 416/241 B |
| 3,911,188 | 10/1975 | Torti et al. | 416/241 B |
| 4,029,897 | 6/1977 | Mayer et al. | 403/29 X |
| 4,176,519 | 12/1979 | Kronogård | 416/244 A |

FOREIGN PATENT DOCUMENTS

| 235102 | 12/1963 | Austria . |
| 1264547 | 3/1968 | Fed. Rep. of Germany . |
| 1671136 | 9/1971 | Fed. Rep. of Germany . |
| 2433698 | 9/1978 | Fed. Rep. of Germany . |
| 2318842 | 2/1977 | France . |

Primary Examiner—Wayne L. Shedd
Attorney, Agent, or Firm—Schwartz, Jeffery, Schwaab, Mack, Blumenthal & Koch

[57] ABSTRACT

Disclosed are means and method for forming elastic connection between ceramic and metallic structural elements. The means comprises a ceramic structural element; a metallic structural element having thermal and elastic properties different from those of the ceramic structural element; and a connecting element connecting the ceramic and metallic structural elements and comprising an insulating resilient body of ceramic material having a thermal conductivity of between about 0.02 and 0.25 W/cmK at a temperature difference between the ceramic and metallic structural elements of from about 100 to 1500 Centigrade degrees, an elastic modulus of between about 5000 and 150,000 N/mm² and being substantially free of plastic deformation.

13 Claims, 6 Drawing Figures

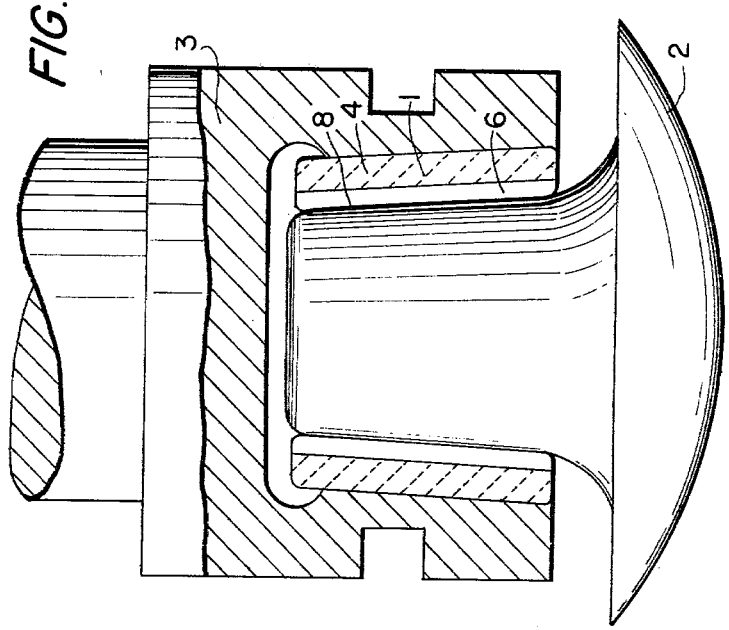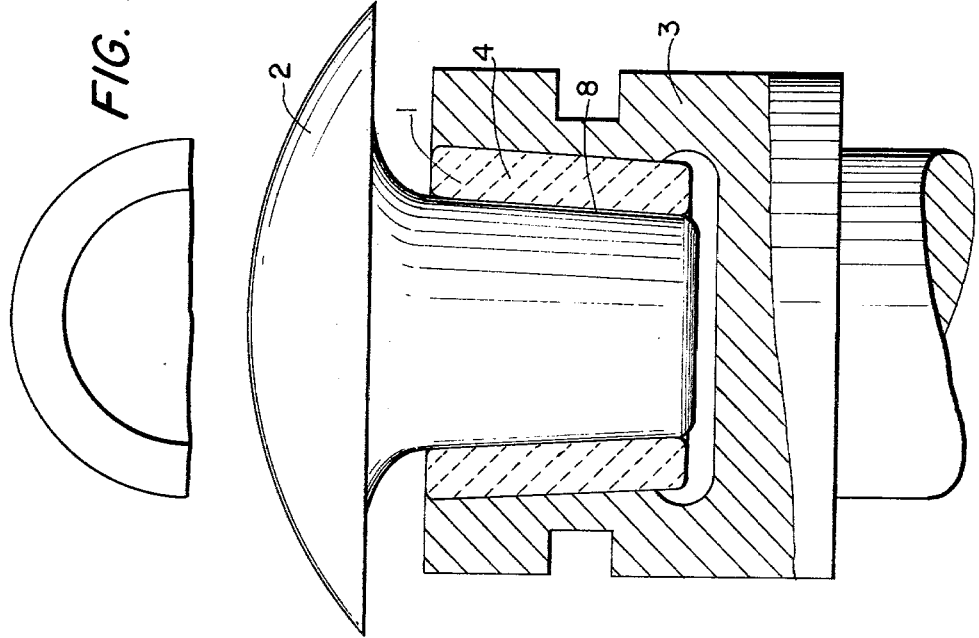

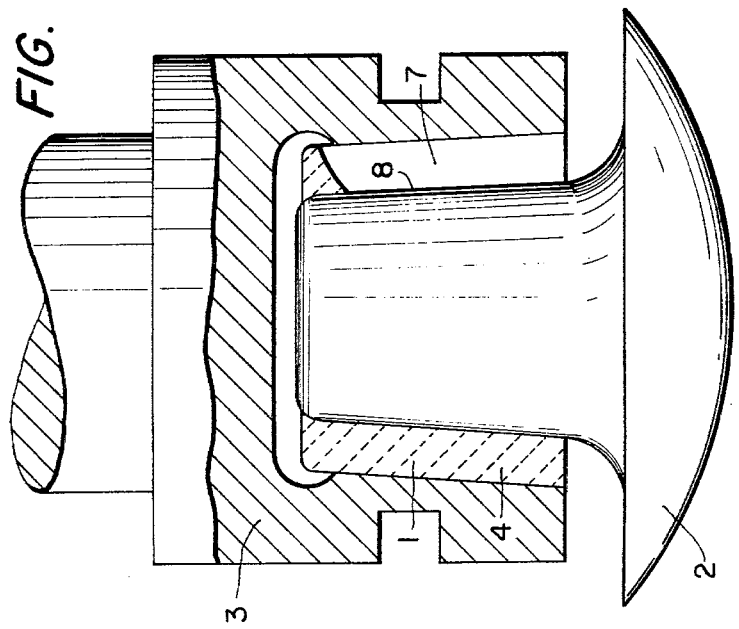
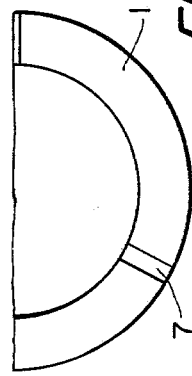
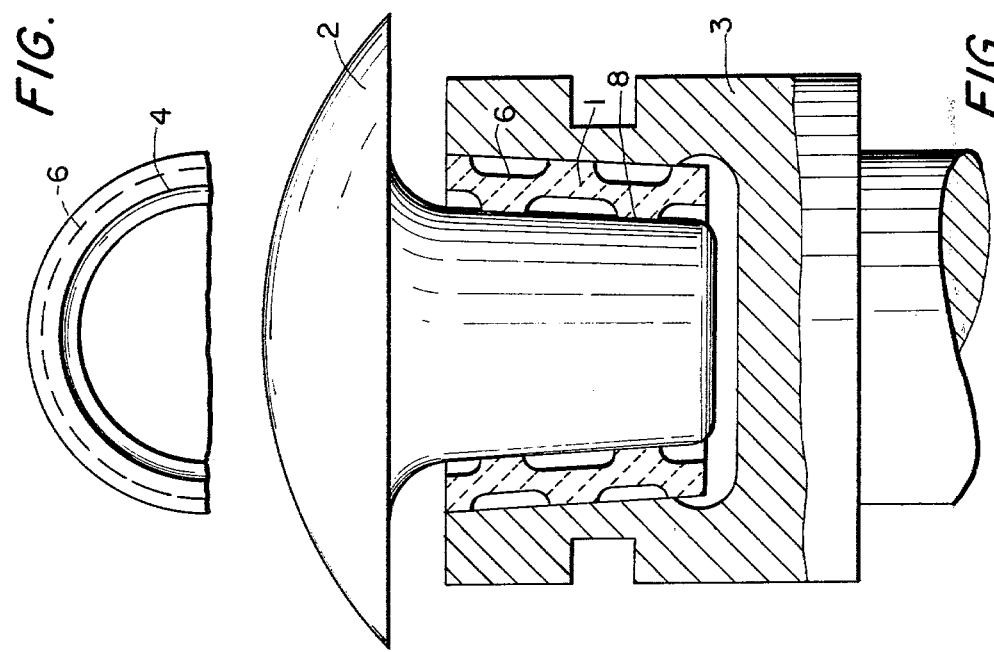

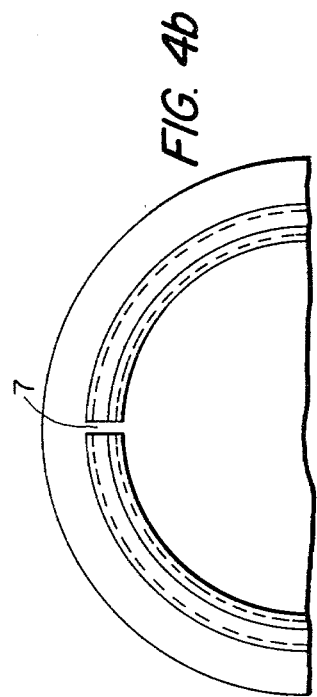
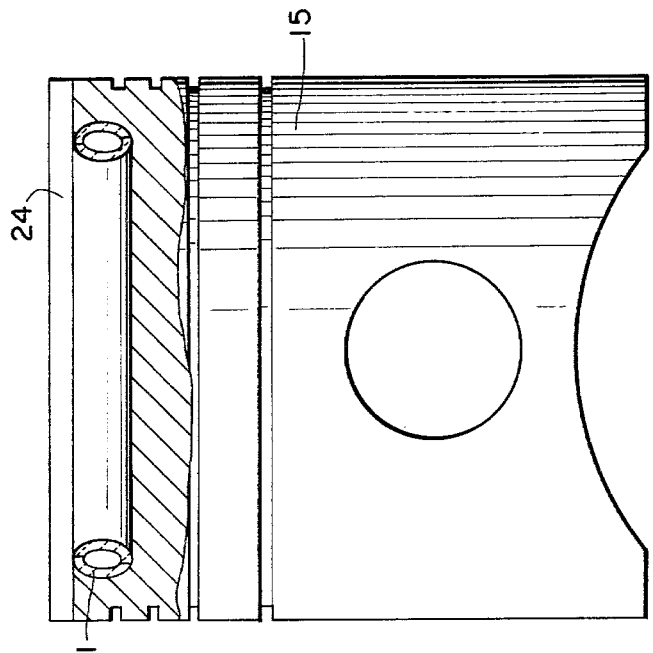
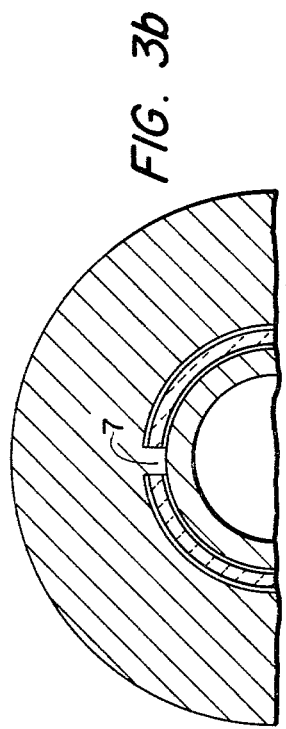
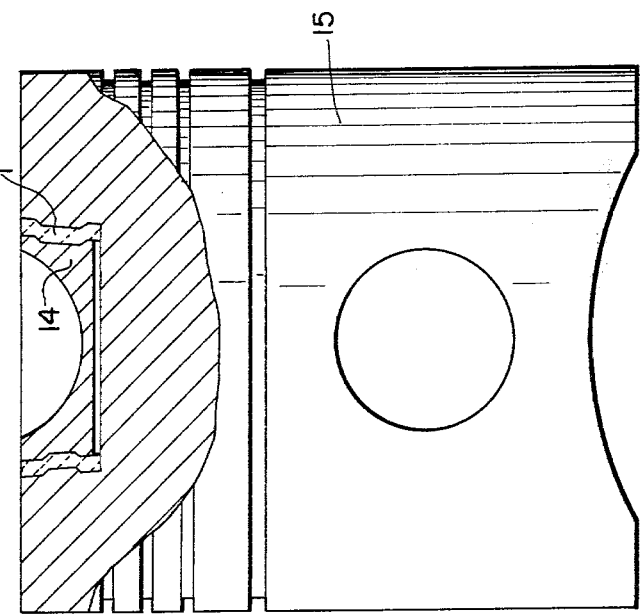

ELEMENT AND METHOD FOR CONNECTING CERAMIC AND METALLIC PARTS

BACKGROUND OF THE INVENTION

The present invention pertains to a connecting element between ceramic and metallic structural parts, and more especially to such a connecting element which is applied to said parts by thermal, mechanical, electrochemical and also ceramic processes. This connecting element is used, in particular, under conditions of high temperature, aggressive media and high mechanical stresses.

When using ceramic structural parts, it is often necessary to join them to metals. This may be effected by means of metallic bonds such as brazing, welding, etc. or mechanically by all possible types of fastenings, such as, e.g., by key-type pins and fasteners and springs. The requirement posed by practical applications in regard to such joints is high operating safety; however, particularly at elevated temperatures, problems occur. Attempts has been made heretofore to satisfy the above-mentioned requirements by the application of suitable metallizing and brazing processes, on the one hand, and by design measures suitable for the materials used, on the other. Metal-ceramic bonds produced in this manner are no longer capable of satisfying the increasing requirements, directed in particular toward higher operating temperatures, reduced wear and extended life of the structural parts.

More recently, therefore, attempts were made to find entirely new ways of accomplishing these bonds. Thus, it is known from U.S. Pat. No. 3,148,981 to use a structural element built up of layers of different compositions, wherein the compositions have increasing contents of metal in the direction of the metal part to be bonded. In composite materials of this type, however, there is always the problem of the incompatibility of certain metal properties in case of a sharp transition from one substance to the other. This is particularly true when the thermal expansion behavior of metals and ceramics is highly different.

Solutions described heretofore, such as metallizing or the use of so-called cermets (i.e. metallic materials with a ceramic matrix or vice versa) are inadequate in certain applications, because the relatively thin connecting zone between the metal and the ceramic does not inhibit the transfer of heat nor does it possess sufficient yield when there are significant differences in the expansion behavior of the structural parts. In addition, different thermal and elastic strains between adjacent structural parts, depending on operating conditions, produce loosening phenomena and overstressing.

SUMMARY OF THE INVENTION

It is therefore an object of the present invention to provide a connecting element which reduces the transfer of heat between different structural parts and has adequate yield to absorb mechanical stresses.

It is a further object of the invention to provide a simple connecting element and a method of joining structural parts, in particular those exposed to elevated temperatures, whereby the thermally or mechanically induced differences in expansion between the structural parts to be joined are equalized and the contact stress in the operating state is limited.

In accomplishing the foregoing objects, there has been provided according to the present invention an elastic connected between ceramic and metallic structural elements, comprising a ceramic structural element; a metallic structural element having thermal and elastic properties different from those of the ceramic structural element; and a connecting element connecting the ceramic and metallic structural elements and comprising an insulating resilient body of ceramic material having a thermal conductivity of between about 0.02 and 0.25 W/cmK at a temperature difference between the ceramic and metallic structural elements of from about 100 to 1500 Centigrade degrees, an elastic modulus of between about 5000 and 150,000 N/mm$^2$ and being substantially free of plastic deformation. In one preferred embodiment one of the structural elements comprises a male portion and the other comprises a female portion and the connecting element comprises an annular sleeve interposed between the male and female portions. The connecting element may also include a slit, whereby its resiliency is increased.

In another embodiment, the ceramic structural element comprises a rotor for a gas turbine and the metallic structural element comprises a rotatable shaft to which the rotor is attached.

In still another embodiment, the ceramic structural element comprises a first part of a piston for a reciprocating internal combustion engine and the metallic structural element comprises a second part of the piston.

According to yet another embodiment, the ceramic structural element comprises a ceramic heat exchanger tube and the metallic structural element comprises a metallic cylinder head of a Stirling engine.

In accordance with a further aspect of the present invention, there has been provided a method for joining ceramic and metallic structural elements, comprising the steps of providing a ceramic structural element and a metallic structural element having thermal and elastic properties different from those of the ceramic structural element; and providing an element for connecting the metallic structural elements. The connecting element comprises an insulating resilient body of ceramic material having a thermal conductivity of between about 0.02 and 0.25 W/cmK at a temperature difference between the ceramic and metallic structural elements of from about 100 to 1500 Centigrade degrees, an elastic modulus of between about 5000 and 150,000 N/mm$^2$ and being substantially free of plastic deformation.

Further objects, features and advantages of the invention will become apparent from the detailed description of preferred embodiments which follows, when considered together with the attached figures of drawing.

BRIEF DESCRIPTION OF THE DRAWINGS

In the drawings:

FIGS. 3a and 3b are a partial cross-sectional view of a ceramic piston skirt and a partial top view of a piston head, respectively, with an insulating resilient body according to the invention used in a Diesel engine;

FIGS. 4a and 4b are a partial cross-sectional view, and a partial top view, respectively, of an insulating resilient body according to the invention between the ceramic piston head and piston body in an Otto internal combustion engine;

DETAILED DESCRIPTION OF PREFERRED EMBODIMENTS

According to the invention, a connecting element between ceramic and metallic structural parts is provided by an elastic ceramic insulating resilient body connecting the structural parts having different thermal and elastic properties, wherein, for a temperature difference between the ceramic and metallic structural parts of 100° to 1500° C., the insulating spring body must have a thermal conductivity of from about 0.02 to 0.25 (W/cmK) and an elastic modulus $E_M$ of from about 5000 to 150,000 (N/mm$^2$) without plastic deformability, so that under all operating conditions the elastic joint between the structural parts is preserved.

Figure 1J:
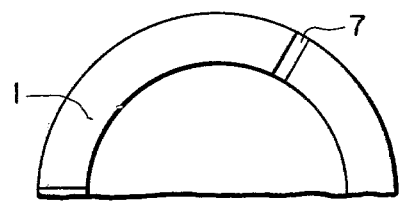
FIGS. 1a–1i are cross-sectional views through the joint between the ceramic and the metallic parts in accordance with different embodiments of the present invention and corresponding partial top or bottom views of the connecting element.
Figure 1I:
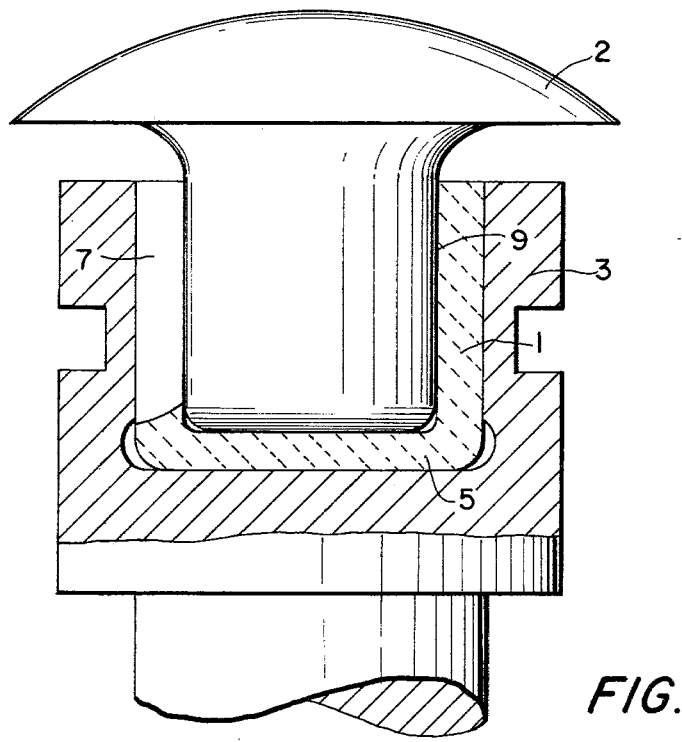

According to one embodiment of the invention, the insulating resilient body 1 is shaped as an annular sheathing 4 or sleeve 5. This is shown in FIGS. 1a–1e. Preferred materials for the insulating resilient body are aluminum titanate, cordierite and silicon nitride, their specific properties being listed in Table 1 below. Of the material properties listed for the insulating resilient body, particularly the thermal conductivity of 0.2 to 0.25 (W/cmK) and the elastic modulus of 5000 to 150,000 (N/mm$^2$) are important for the functional capability of the joint. Similarly, the body should not be capable of plastic deformation. In cases of extreme differences, particularly at different temperatures, the coefficient of thermal expansion also plays a role. However, the essential characteristic of the ceramic insulating resilient body 1 is to be found in its elastic properties and in its thermal insulating properties with respect to the other structural parts 2, 3. In order to further increase resilient properties, in a preferred embodiment slits 7 are provided in the insulating resilient body 1, as may be seen in FIGS. 1g and 1h. Furthermore, the joining forces between the individual parts may be conformed by roughening or profiling the surface of the insulating resilient body by providing a plurality of protrusions and/or indentations 6, as shown in FIG. 1d and 1e. Another measure to enhance its solid seating on the structural part consists of providing a conical joint 8 in place of the cylindrical one 9. All of these measures yield a low-stress and therefore operationally safe joint between the ceramic and metal parts.

Figure 2:
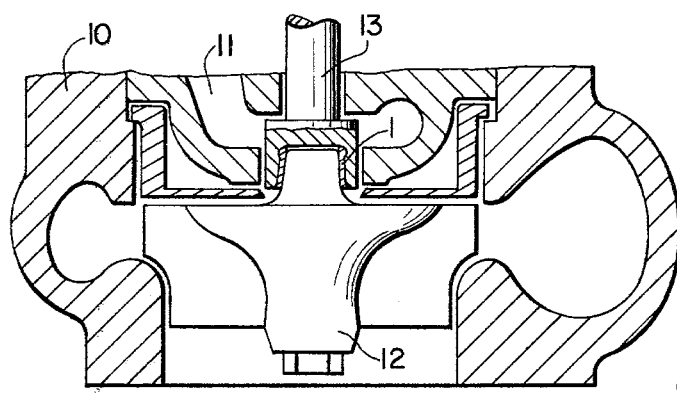
FIG. 2 is a cross-sectional view of another embodiment of the invention used in a turbo-supercharger.

A demonstrative example of the importance of the insulating resilient body 1 is represented by applications in combustion engines wherein, in the future, it will be necessary to replace metallic alloys by ceramics in order to attain higher efficiencies and to save energy, as well as to reduce environmental pollution. In FIG. 2, the ceramic insulating resilient body 1 is installed between the ceramic rotor 12 and a metal shaft 13 in an exhaust gas turbosupercharger. High centrifugal forces and strain differences are generated in this instance, whereby the loosening of connections and excentric displacement may readily be caused. The ceramic materials for the rotor 12 may consist, for example, of reaction bonded silicon nitride, together with infiltrated or sintered silicon carbide. Chromium-nickel steels are especially suitable for the shaft 13. Characteristic material data are again compiled in Table 1. In this embodiment, for example, for the rotor 12 temperatures between 800° and 1100° C. occur and in the bearing area of the shaft the temperatures are approximately 150° C. It was found during experimentation that a shrink joint between the steel shaft 13 and the ceramic part 12, made, for example, of reaction bonded silicon nitride becomes critical during cooling from 400° C. to room temperature. When using a smooth insulating resilient body 1 of aluminum titanate having an average roughness of approximately 1 μm, a greatly improved range of application in excess of 800° C. is already obtained. Furthermore, no fracture or loosening of the ceramic-metal bond occurred during the cooling of the uniformly heating bond from 800° C. to −160° C. Also, the temperature of the metal shaft 13 was lowered by approximately 100° C. by means of the ceramic insulating resilient body 1 at an application temperature of 800° C. At the same time, the loosening temperature of the uniformly heating bond was raised by approximately 400° C. Thus, the use of the insulating resilient body 1 solved not only the problem of joining the ceramic and metallic structural parts 2, 3, but also lowered the temperature of the bearing, so that it is possible to reduce the size of the cooling channels 11. This method of joining has further advantages with respect to the pure metal version, in that the centrifugal stresses are reduced by 60%. Also, the moment of inertia is reduced, because the ceramic material has a lower specific gravity than the metal. Furthermore, higher mechanical strength and resistance to oxidation, and also corrosion resistance, are obtained at temperatures up to 1500° C., and costly metal alloys may be replaced by inexpensive ceramics. This represents merely one example of numerous other applications, wherein, for example, flywheels or other rotors, with or without bores, or fan blades are to be joined with rotating shafts.

Figure 5:
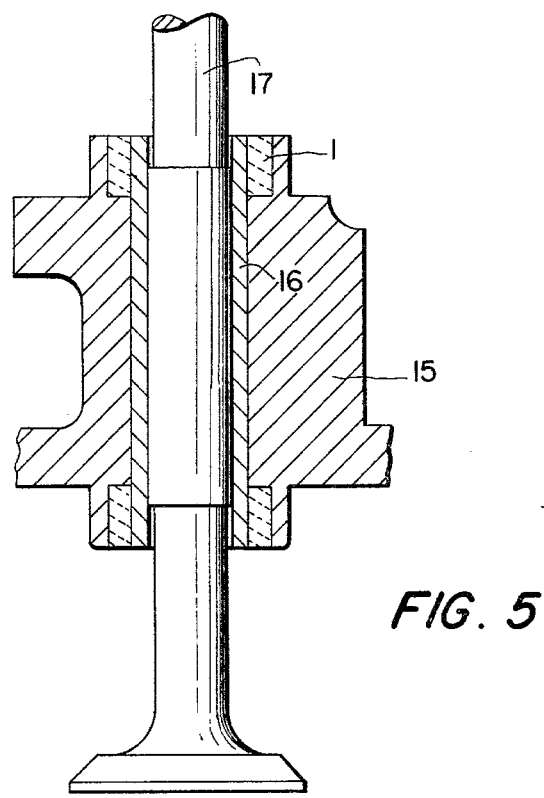
FIG. 5 is a cross-sectional view of an insulating resilient body of the invention used in a ceramic valve stem guide.

Additional examplary applications of the present invention, specifically for combustion engines, are found in FIGS. 3 to 5. In future developments of combustion engines, ceramic materials will be used increasingly, for example, in pre-combustion chambers, turbulent combustion chambers, piston recesses 14 or piston heads. The problem here again is the creation of a reliable joint between ceramic and metallic structural parts. From a manufacturing standpoint, the casting technique is advantageous because it places the ceramic parts under compressive stress. It also involves no additional costs. In the process, the ceramic structural part 2 must be capable of withstanding the stress of the thermal shock during the casting of aluminum or gray cast iron, and on the other hand, no loosening or overstressing of the joint must take place under any operating conditions. Aluminum titanate has proved to be suitable as the cast ceramic material, but it does not always withstand alternating exposures to erosion, corrosion and gas pressures. Hot extruded and reaction bonded silicon nitride and silicon carbide are better suited for this purpose. The latter materials are less resistant to thermal shock exposures and have lower elastic yield properties, together with higher thermal conductivities, but as the result of the partial thermal insulation of the combustion chambers, advantages are obtained in regard to quiet running, cold starting behavior, efficiency, fuel consumption, exhaust gas quality and cooling capacity. The use of the insulating resilient body 1 according to the invention here again affords a reliable connection between the ceramic part 2 and the metal part 3, together with the necessary thermal installation.

In detail, FIGS. 3a and 3b show a ceramic piston recess 14 for a Diesel engine. The piston recess 14 itself consists of silicon nitride or silicon carbide. The insulating resilient body 1 is positively connected with the piston recess 14 and the piston 15. The wall of the insulating resilient body 1 is between about 2 and 5 mm thick. The insulating resilient body 1 further contains slit 7 for the purpose of installation and is joined by means of ceramic adhesives for the casting process with the piston recess. In the course of the casting process, the unit formed by the piston skirt and the insulating resilient body is cast as the core in the piston 15 and thus effects an elastic bond.

Similarly, the insulating resilient body 1 may be inserted between a ceramic piston head 24 and the head 15 of the cylinder in an Otto combustion engine, as shown in FIGS. 4a and 4b. The resilient body 1 in this case is of a hollow shape, whereby its elastic yielding is increased.

The insulating resilient body 1 may also be used with a ceramic valve stem guide passageway, as shown in FIG. 5. In this case, the valve stem 17 moves in a ceramic guide sleeve 16, connected with the cylinder head 15 by means of an insulating resilient body 1. In this case, the emphasis is on the mechanical wear properties of the ceramic material. Because of this and also because of their high thermal conductivity and resistance to thermal shock, infiltrated silicon carbides are particularly suitable for the purpose. In this application, the insulating resilient body 1 essentially performs an elastic yield function in regard to loosening at operating temperatures.

Figure 6:
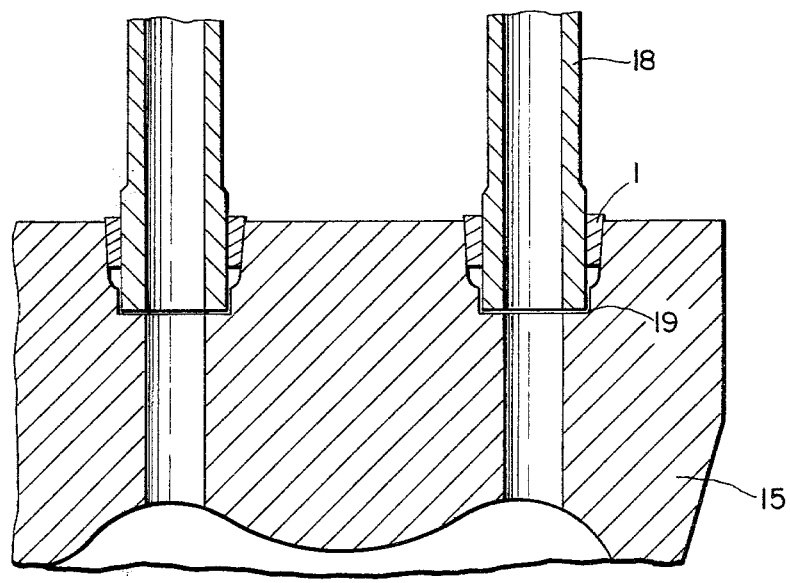
FIG. 6 is a cross-sectional view of an insulating resilient body between ceramic heat exchange tubes and metallic connections in a Stirling engine.

Another example of an application for the invention may be seen in FIG. 6. In order to increase the efficiency, for example, of a Stirling engine, it is advisable to use a ceramic heat exchanger. The problem therein consists of the fact that a vacuum-tight elastic connection 19 must be achieved between the metallic cylinder head 15 and the ceramic heat exchanger tubes 18. Because of the high internal pressure, silicon carbide, particularly infiltrated SiC, is suitable for the ceramic tubing. However, any tight brazing between the ceramic material and the metal at 1200° C. leads to the destruction of the ceramic tube 18 because of the high shrinking stresses. This problem may be solved by axially limiting the area of the brazed joint and effecting an elastic bond by means of the insulating resilient body 1.

The essential technical and economic advantages of the insulating ceramic resilient body are to be found in improved functional performance, rapid and cost effective installation and the safe and strong joining of machine parts. Furthermore, simple design of the connecting parts and the equalization of the differing mechanical and thermal expansions of machine parts made of different materials are provided for. The elastic bearing support of shafts at elevated temperatures is also possible. Furthermore, the elastic yield obtained affords a large range of tolerance for the parts to be joined. The advantages of ceramics with respect to thermal insulation and resistance to temperature, corrosion, erosion, oxidation and aggressive media can be fully utilized by the combination of materials via the insulating resilient body.

TABLE 1

CHARACTERISTICS OF SELECTED MATERIALS FOR BONDING TOGETHER STRUCTURAL ELEMENTS OF CERAMIC AND METAL

| | | CERAMIC STRUCTURAL ELEMENTS | | | | | | METALLIC STRUCTURAL ELEMENTS |
|---|---|---|---|---|---|---|---|---|
| | | | | | INSULATING RESILIENT BODY | | | |
| Properties | Dim. | $Si_3N_4$[1] | $Al_2O_3$[2] | $SiC + Si$[3] | $Si_3N_4$[4] | $2MgO \cdot 2Al_2O_3 \cdot 5SiO_2$[5] | $Al_2TiO_5$[6] | Steel[7] |
| Density | g/cm$^3$ | 3.18 | 3.95 | 3.0 | 2.2–2.5 | 1.7–2.1 | 3.0 | 7.9 |
| Bending Strength | N/mm$^2$ | 700 | 450 | 360 | 170–215 | 20–110 | 10–60 | 870 |
| Elastic Modulus | 10$^3$N/mm$^2$ | 310 | 400 | 170–400 | 90–150 | 20–70 | 5–60 | 210 |
| Coefficient of Expansion | 293–1273 K 10$^6$/1K | 3.5 | 8.0 | 4.6 | 2.9 | 1.5–3.5 | 0.5–6 | 10.6 |
| Thermal conductivity | W/cm K | 0.30 | 0.27 | 0.42 | 0.19–0.25 | 0.03–0.1 | 0.02–0.05 | 0.21 |

W = watt = 0.24 cal/sec
N = newton = kg. m/sec$^2$
[1] heat pressed silicon nitride
[2] aluminum oxide
[3] silicon carbide infiltrated with silicon
[4] reaction bonded silicon nitride
[5] cordierite
[6] aluminum titanate
[7] chrome-nickel-steel

What is claimed is:

1. An elastic connection between ceramic and metallic structural elements, comprising
   a ceramic structural element;
   a metallic structural element having thermal and elastic properties different from those of said ceramic structural element; and
   a connecting element connecting said ceramic and metallic structural elements, said connecting element comprising an insulating resilient body of ceramic material having a thermal conductivity of between about 0.02 and 0.25 W/cmK at a temperature difference between said ceramic and metallic structural elements of from about 100 to 1500 Centigrade degrees, an elastic modulus of between about 5000 and 150,000 N/mm$^2$ and being substantially free of plastic deformation.

2. An elastic connection as defined by claim 1, wherein one of said structural elements comprises a male portion and the other comprises a female portion and wherein said connecting element comprises an annular sleeve interposed between said male and female portions.

3. An elastic connection as defined by claim 1, wherein said connecting element comprises a smooth surface.

4. An elastic connection as defined by claim 1, wherein said connecting element comprises a roughened surface.

5. An elastic connection as defined by claim 1, wherein said connecting element comprises a surface, having a plurality of protrusions and/or indentations.

6. An elastic connection as defined by claim 1, wherein said connecting element includes a slit, whereby its resiliency is increased.

7. An elastic connection as defined by claim 1, wherein said connecting element comprises aluminum titanate, silicon nitride and cordierite.

8. An elastic connection as defined by claim 1, wherein said ceramic structural element comprises a rotor for a gas turbine and said metallic structural element comprises a rotatable shaft to which said rotor is attached.

9. An elastic connection as defined by claim 1, wherein said ceramic structural element comprises a first part of a piston for a reciprocating internal combustion engine and said metallic structural element comprises a second part of said piston.

10. An elastic connection as defined by claim 9, wherein said ceramic structural element comprises a piston crown insert.

11. An elastic connection as defined by claim 9, wherein said ceramic structural element comprises a piston head.

12. An elastic connection as defined by claim 1, wherein said ceramic structural element comprises a ceramic heat exchanger tube and said metallic structural element comprises a metallic cylinder head of a Stirling engine.

13. An elastic connection as defined by claim 1, wherein said metallic structural element is comprised of steel.

* * * * *